(12) United States Patent
Schaeuble (10) Patent No.: US 10,611,344 B2
(45) Date of Patent: Apr. 7, 2020

(54) WIPER ARM FOR A WINDSCREEN WIPER SYSTEM OF A MOTOR VEHICLE, WIPER BLADE AND WIPER DEVICE

(71) Applicant: Valeo Systèmes d'Essuyage, Le Mesnil Saint Denis (FR)

(72) Inventor: Michael Schaeuble, Vaihingen/enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 293 days.

(21) Appl. No.: 14/890,739

(22) PCT Filed: May 5, 2014

(86) PCT No.: PCT/EP2014/059137
§ 371 (c)(1),
(2) Date: Nov. 12, 2015

(87) PCT Pub. No.: WO2014/184037
PCT Pub. Date: Nov. 20, 2014

(65) Prior Publication Data
US 2016/0101763 A1 Apr. 14, 2016

(30) Foreign Application Priority Data
May 13, 2013 (DE) .......... 10 2013 104 902

(51) Int. Cl.
*B60S 1/40* (2006.01)
*B60S 1/38* (2006.01)
(Continued)

(52) U.S. Cl.
CPC .......... *B60S 1/4077* (2013.01); *B60S 1/3415* (2013.01); *B60S 1/3425* (2013.01); *B60S 1/3862* (2013.01);
(Continued)

(58) Field of Classification Search
CPC .............. B60S 1/3862; B60S 1/524
(Continued)

(56) References Cited

U.S. PATENT DOCUMENTS

2011/0185531 A1* 8/2011 Egner-Walter .......... B60S 1/381
15/250.01
2012/0246859 A1* 10/2012 Schaeuble ............. B60S 1/3849
15/250.32

FOREIGN PATENT DOCUMENTS

CN 102164786 A 8/2011
CN 102481901 A 5/2012
(Continued)

OTHER PUBLICATIONS

FR2964620A1 (machine translation), 2012.*
(Continued)

*Primary Examiner* — Andrew A Horton
(74) *Attorney, Agent, or Firm* — Osha Liang LLP (57) ABSTRACT

The invention relates to a wiper arm (10) for a windscreen wiper system of a motor vehicle, with a receiving region (11) for a wiper blade adapter (55), wherein in the receiving region (11) an adapter element (30; 30*a*) is arranged, serving for the supplying of washing fluid, wherein the adapter element (30; 30*a*) is able to be connected on the one hand with a supply line (32) for the washing fluid and on the other hand has at least one outlet (34) for the washing fluid, which is able to be connected with the wiper blade adapter (55), wherein the at least one outlet (34) is aligned with a first mounting or respectively dismantling direction (17) of the wiper blade adapter (55).

18 Claims, 10 Drawing Sheets

(51) Int. Cl.
*B60S 1/52* (2006.01)
*B60S 1/34* (2006.01)

(52) U.S. Cl.
CPC .............. *B60S 1/4048* (2013.01); *B60S 1/524* (2013.01); *B60S 2001/4058* (2013.01)

(58) Field of Classification Search
USPC ..................................................... 15/250.04
See application file for complete search history.

(56) References Cited

FOREIGN PATENT DOCUMENTS

| | | | | |
|---|---|---|---|---|
| DE | 102008011449 | A1 | | 9/2009 |
| DE | 10 2010 047098 | A1 | | 4/2012 |
| DE | 10 2011 118 220 | A1 | | 5/2012 |
| DE | 102010049740 | A1 | | 5/2012 |
| DE | 10 2011 001689 | A1 | | 10/2012 |
| FR | 102008021457 | A1 * | 11/2009 | ............ B60S 1/3862 |
| FR | 2964620 | A1 * | 3/2012 | ............ B60S 1/3805 |
| FR | 2 968 256 | A1 | | 6/2012 |
| FR | 2505440 | A2 * | 10/2012 | ............ B60S 1/3862 |

OTHER PUBLICATIONS

DE102008021457A1 (machine translation), 2009.*
International Search Report issued in PCT/EP2014/059137 dated Jul. 17, 2014 (2 pages).
The First Office Action issued in corresponding Chinese Patent Application No. 201480038774.1, dated Nov. 30, 2016 (23 pages).

* cited by examiner

WIPER ARM FOR A WINDSCREEN WIPER SYSTEM OF A MOTOR VEHICLE, WIPER BLADE AND WIPER DEVICE

PRIOR ART

The invention relates to a wiper arm for a windscreen wiper system of a motor vehicle according to the preamble of claim 1. Furthermore, the invention relates to a wiper blade, in particular for fastening to a wiper arm according to the invention, and to a wiper device consisting of a wiper arm according to the invention and a wiper blade.

A wiper arm according to the preamble of claim 1 is already known. Said wiper arm makes it possible for washing fluid to be supplied to a wiper blade, which is connected to the wiper arm, by an adapter element arranged in the wiper arm, wherein the connection between a wiper blade adapter and the adapter element is produced automatically. The mounting or dismantling of the wiper blade takes place by a single wiper blade movement running perpendicularly to the receiving region.

A further wiper arm is known from DE 10 2011 118 220 A1. The known wiper arm has a U-shaped cross-section in a receiving region for a wiper blade adapter of a wiper blade. On the side facing the wiper blade adapter, receiving openings for projections arranged on the wiper blade adapter are constructed on the sidewalls of the receiving region, starting from a lower boundary edge of the sidewall in each case. Furthermore, the receiving region of the wiper arm is covered by a securing element which likewise substantially has a U-shaped cross-section and is arranged displaceably between a mounting or dismantling position for the wiper blade and an operating position for the wiper blade, in which operating position the wiper blade is secured on the wiper arm. The mounting or dismantling of the wiper blade on or from the wiper arm likewise takes place perpendicularly to the extent of the wiper blade or the wiper arm.

Furthermore, what are referred to as "aqua-blade" wiper blades, in which a washing fluid is guided to spray openings formed on the longitudinal sides of the wiper blade, are known from the prior art. The supplying of the wiper blade with the washing fluid customarily takes place here via a supply line, which is guided within the wiper arm and is in the form of a flexible tube. Said tube is hydraulically connected at least indirectly to the wiper blade adapter. It is essential here that the connections known from the prior art customarily take place here in the longitudinal direction of the wiper arm, and therefore connections of this type are not suitable, in the case of the wiper arm mentioned at the beginning, for ensuring the hydraulic supply of the wiper blade with washing fluid at the same time as the wiper blade is mounted or dismantled, without an additional manual outlay.

DISCLOSURE OF THE INVENTION

Starting from the depicted prior art, the invention is based on the object of developing a wiper arm for a windscreen wiper system of a motor vehicle according to the precharacterizing clause of claim 1 in such a manner that said wiper arm is suitable, firstly, for ensuring the hydraulic supply of the wiper blade with washing fluid as the wiper blade is mounted on or dismantled from the wiper arm without an additional outlay, and, secondly, for being able to dispense with the securing element known from the prior art and connected to the wiper arm.

This object is achieved according to the invention, in the case of a wiper arm for a windscreen wiper system of a motor vehicle with the features of claim 1, in that the outlet runs at least approximately in the direction of the longitudinal axis of the wiper arm in the receiving region, and in that the receiving region is constructed to enable a mounting or respectively dismantling of the wiper blade adapter by two necessary movements on the wiper blade adapter in different directions.

Advantageous developments of the wiper arm according to the invention for a windscreen wiper system of a motor vehicle are specified in the dependent claims.

In a preferred refinement of the wiper arm, it is provided that the receiving region has a U-shaped cross-section with two sidewalls parallel to one another and with a transverse wall connecting the two sidewalls, and with at least two receiving openings constructed on the sidewalls to receive elevations arranged on the wiper blade adapter in the second mounting or respectively dismantling direction running at least substantially perpendicularly to the transverse wall.

For the fastening or arrangement of the adapter element in the wiper arm, it is provided that the adapter element has on the side facing the sidewall a fastening extension, which projects into a receiving opening of the sidewall having a closed cross-section, and that the cross-sections of the receiving opening and of the fastening extension are coordinated with one another so that the adapter element is arranged at least substantially in a stationary manner in the receiving opening. Optionally, a certain moveability is permitted for component tolerance reasons.

It is very particularly preferred if the adapter element is constructed in addition for the supply of current of a wiper blade, having a heating device, by means of the wiper blade adapter. The adapter element thereby fulfils an additional function without an additional component being required for the arrangement or fastening of current-carrying elements.

In order, during the mounting or dismantling of the wiper blade, in addition to the (automatic) connection or the release of the hydraulic connection, to construct or to release the corresponding electrical connections at the same time without an additional outlay, it is particularly preferably provided that the carrying elements, serving for the supply of current, arranged on the side of the wiper blade adapter facing the adapter element, are arranged parallel to the outlet.

An additional mechanical fastening or coupling of the wiper blade adapter to the wiper arm can be achieved if on the sidewalls of the wiper arm in the region of an open front side of the receiving region, projections are provided, projecting away from the front side of the wiper arm and aligned with the sidewalls, which projections are constructed to hold the wiper blade adapter in the receiving region in its operating position in a direction running perpendicularly to the first mounting or respectively dismantling direction.

The invention also comprises a wiper blade, in particular for fastening to a wiper arm according to the invention, with a wiper blade adapter, which is constructed to be received in a wiper arm, wherein at least one inlet for the supplying of a washing fluid is formed on the wiper blade adapter, and wherein the at least one inlet is aligned parallel to a first mounting or respectively dismantling direction of the wiper blade adapter. According to the invention, it is provided that the wiper blade adapter consists of at least two wiper blade adapter elements, and that the at least two wiper blade adapter elements are constructed to be received in the wiper arm in a second mounting or respectively dismantling direction arranged substantially perpendicularly to the first mounting or respectively dismantling direction.

In order to fasten the wiper blade adapter or the wiper blade to the wiper arm in the operating position of the wiper blade, it is preferably provided that on a first wiper blade adapter element of the wiper blade adapter, elevations or extensions are constructed on its sidewalls for introduction in receiving openings of a wiper arm, and that the elevations are locked by the second wiper blade adapter element in the operating position of the wiper blade in the receiving openings.

In order to retain the wiper blade in the wiper arm in the direction of the first mounting or dismantling direction, it is preferably provided that between two of the wiper blade adapter elements a detent connection is constructed, which fixes the two wiper blade adapter elements with respect to one another in the direction of the first mounting or respectively dismantling direction.

Alternatively, however, it can also be provided that between the second wiper blade adapter element and the adapter element, which is arranged in the receiving region of the wiper arm and serves for the supply of the washing fluid, a detent connection is constructed, which fixes the second wiper blade adapter element in the direction of the first mounting or respectively dismantling direction.

Furthermore, the wiper blade adapter is fixed or fastened in the wiper arm in that in the second wiper blade adapter element openings are provided for the receiving of projections constructed on the wiper arm, which are constructed to hold the wiper blade adapter in its operating position in a direction running perpendicularly to the first mounting or respectively dismantling direction.

In the prior art, the wiper blade adapter customarily consists of two wiper blade adapter elements arranged pivotably with respect to each other and of a securing element, which is arranged on or is fastened to the wiper arm, in order to fix the wiper blade adapter to the wiper arm in the operating position. The function of the securing element is realized according to the invention by the first wiper blade adapter element. Furthermore, it is preferably provided that the wiper blade adapter comprises a third wiper blade adapter element, which is connected directly with a wiper blade body of the wiper blade, and that the first and the third wiper blade adapter element are arranged swivelably with respect to one another.

It is particularly preferred if the third wiper blade adapter element has a U-shaped cross-section, in which the second wiper blade adapter element is received at least partially, and if the first wiper blade adapter element has a U-shaped cross-section, which partially receives the second wiper blade adapter element and encompasses the third wiper blade adapter element in the region of its sidewalls.

Furthermore, it is particularly preferably provided if the second wiper blade adapter element has extensions, which are arranged swivelably and displaceably into guide slots of the third wiper blade adapter element.

In a modified embodiment of the invention, it is provided that the first wiper blade adapter element and the second wiper blade adapter element are positioned with respect to one another by a form-fitting connection in the direction of the second mounting or respectively dismantling direction. A construction of this type makes it possible to construct the two wiper blade adapter elements as a premountable assembly which is subsequently connected to the third wiper blade adapter element. In particular, the desired arrangement of the two wiper blade adapter elements mentioned in a common plane parallel to the wiper arm is thereby made possible.

In a structurally preferred refinement of the form-fitting connection, the latter comprises detent hook elements constructed on one of the wiper blade adapter elements, which detent hook elements embrace guides constructed on the other of the wiper blade adapter elements, wherein the detent hook elements are constructed such that through a relative movement of the two wiper blade adapter elements in a mounting direction, the detent hook elements embrace the guides and, in doing so, lock in position with the guides. This structural configuration permits particularly simple mounting by moving the two wiper blade adapter elements towards each other.

An alternative form-fitting connection is constructed in such a manner that the latter has guide webs constructed on one of the wiper blade adapter elements, arranged parallel to the first mounting or respectively dismantling direction, with recesses formed between the guide webs, wherein holding webs constructed on the other of the wiper blade adapter elements are able to be introduced into the recesses up to a height beneath the guide webs, and wherein the holding webs after the introduction into the guide webs are displaceable in a direction parallel to the first mounting or respectively dismantling direction such that the holding webs are arranged in overlap with the guide webs.

The wiper blade adapter elements which are arranged in a stationary manner with respect to one another in a plane parallel to the first mounting or dismantling direction are made possible in that stop webs are provided parallel to the guide webs, in that the distance between the guide webs and the stop webs corresponds to the height of the holding webs, and in that the stop webs are arranged at least partially aligned with the recesses.

In order to limit the movement travel of the first and of the second wiper blade adapter element during the mounting or dismantling, it is provided, in a further structural refinement of the invention, that the first wiper blade adapter element or the second wiper blade adapter element has at least one stop element, which acts as a movement stop for the two wiper blade adapter elements in the direction of the first mounting or respectively dismantling direction.

Finally, the invention comprises a wiper device for cleaning a vehicle window, which wiper device consists of a wiper arm according to the invention and a wiper blade according to the invention.

Further advantages, features and details of the invention emerge from the description below of preferred exemplary embodiments and with reference to the drawing.

In the drawing.

Identical elements or elements having the same function are provided with the same reference numbers in the figures.

Figure 1:
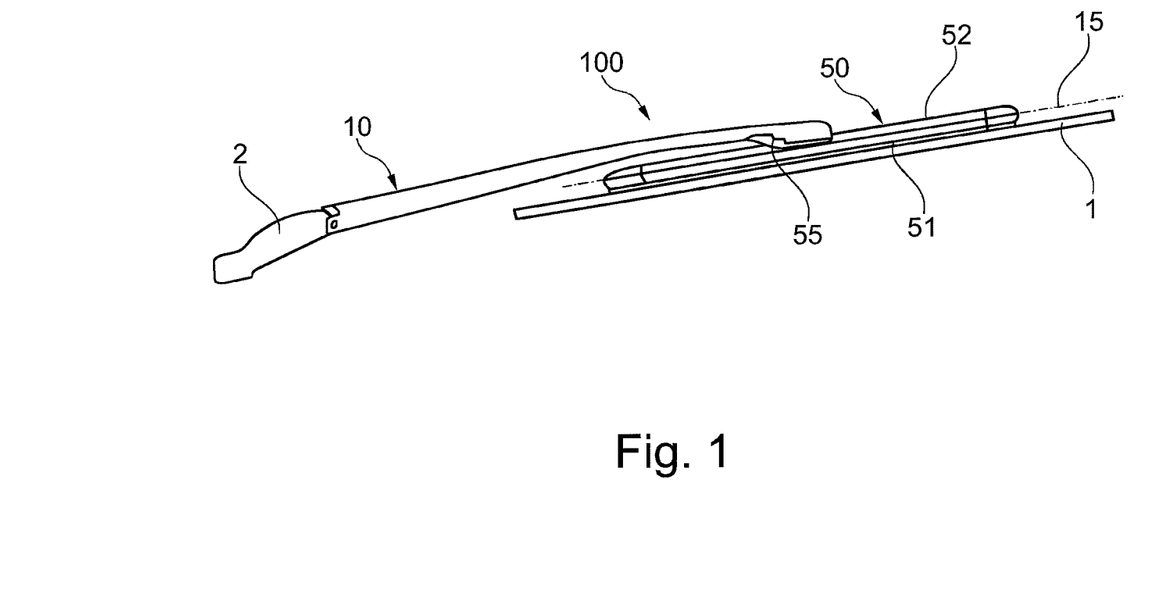
FIG. 1 shows a simplified illustration of the components of a wiper device according to the invention for wiping a vehicle window.

FIG. 1 illustrates a wiper device 100 according to the invention of a windscreen wiper system for cleaning a vehicle windscreen 1 of a motor vehicle. The wiper device 100 has a wiper arm 10 which is arranged pivotably in a wiper arm joint 2, wherein the wiper arm joint 2, in turn, is coupled, at least indirectly, to a drive (windscreen wiper motor), which is not illustrated. In addition to the wiper arm 10, the wiper device 100 comprises a wiper blade 50, which is fastened exchangeably to the wiper arm 10. The wiper blade 50 has a wiper blade rubber 51 which can be placed against the vehicle windscreen 1 and is arranged on an elongate wiper blade body 52. The wiper blade 50 or the wiper blade body 52 has, on the longitudinal sides thereof, spray openings (not illustrated) for applying a washing fluid to the vehicle windscreen 1. Furthermore, the wiper blade 50 is designed as a "heatable wiper blade" in order in particular to avoid the wiper blade rubber 51 from adhering or freezing to the vehicle windscreen 1 at low temperatures. Since both the construction of a wiper blade 50 with corresponding spray openings and the construction of a wiper blade 50 as a heatable wiper blade 50, also in combination, are known per se, only details essential to the invention are explained below in this regard.

Furthermore, in order to fasten the wiper blade 50 to the wiper arm 10, the wiper blade 50 comprises a wiper blade adapter 55, which is only partially visible in FIG. 1 and is connected to the wiper blade body 52 and which serves for the exchangeable fastening of the wiper blade 50 to the wiper arm 10.

Figure 2:
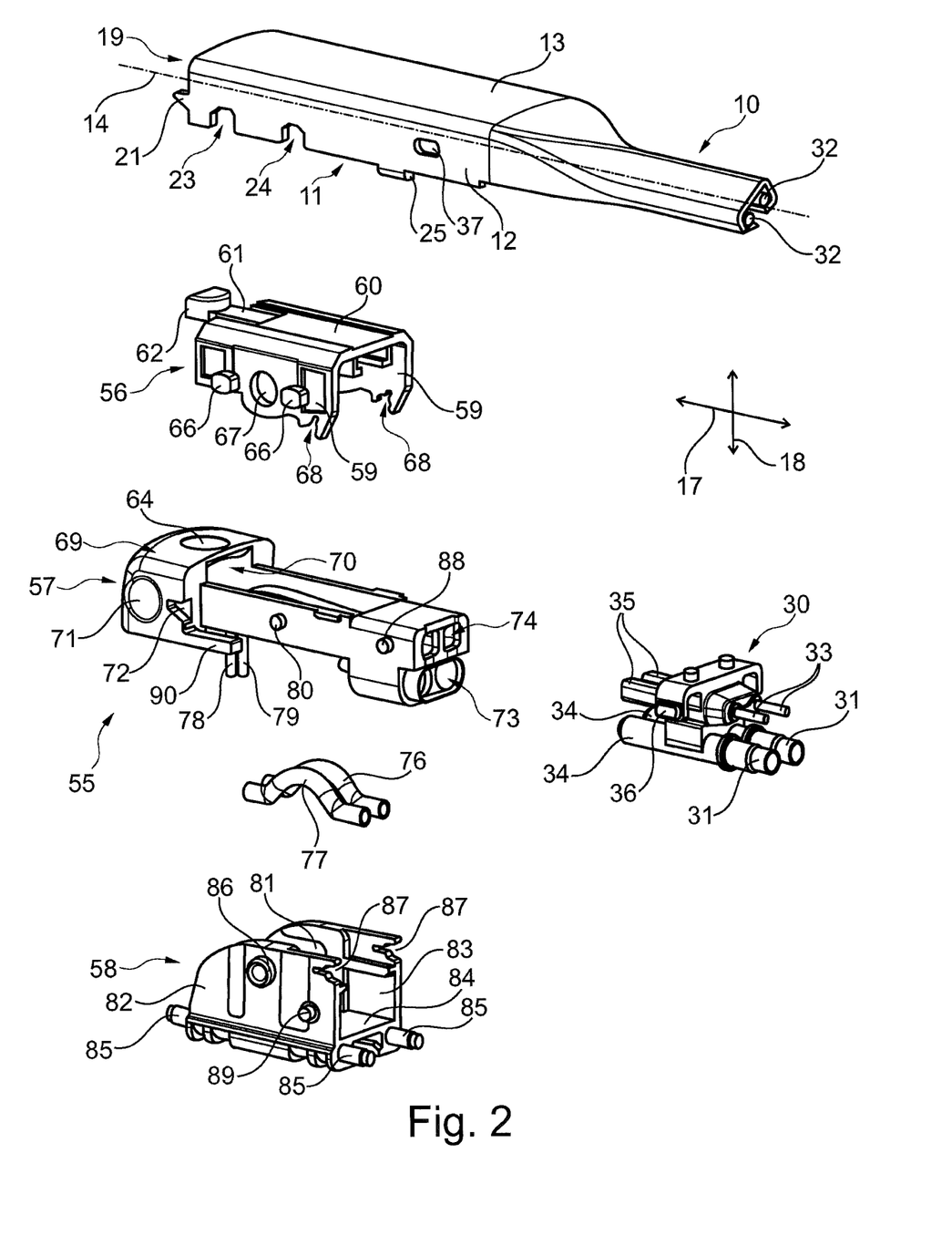
FIG. 2 shows a perspective illustration of a partial region of a wiper arm according to the invention and parts of a wiper blade according to the invention.

FIG. 2 illustrates details of the wiper blade adapter 55 and of the wiper arm 10. The wiper arm 10, which is composed of sheet metal, is designed as a punched and bent part and has a receiving region 11 for the wiper blade adapter 55. In the receiving region 11, the wiper arm 10 is provided with a substantially U-shaped cross-section. For this purpose, the receiving region 11 is provided with two side walls 12 arranged parallel to each other and a transverse wall 13 which connects the two side walls 12 to each other and forms the upper side of the wiper arm 10 in the receiving region 11. The elongate receiving region 11 has a longitudinal axis 14 which preferably runs parallel to the longitudinal axis 15 of the wiper blade (FIG. 1). Furthermore, in FIG. 2, a first mounting and dismantling direction 17 is denoted by one double arrow and a second mounting or dismantling direction 18 which is arranged perpendicularly to the first direction is indicated by the other double arrow.

The first mounting or dismantling direction 17 runs here parallel to or aligned with the longitudinal axis 14 of the receiving region 11.

The wiper arm 10 has an open front side 19 on the side facing away from the wiper arm joint 2. From the two side walls 12 of the wiper arm 10, an approximately triangular projection 21, the height of which increases in the direction of the front side 19, extends at the open front side 19 on each side wall 12 in alignment with the side walls 12. The two projections 21 serve for fixing or positioning the wiper blade adapter 55 in the direction of the second mounting or dismantling direction 18.

On that side of the two side walls 12 which faces away from the transverse wall 13, said side walls each have two receiving openings 23, 24 which are arranged spaced apart from each other in the longitudinal direction of the wiper arm 10. The two receiving openings 23, 24 serve for positioning or fixing the wiper blade adapter 55 in the direction of the first mounting or dismantling direction 17. Furthermore, a holding section 25 which is bent over inwards is provided in each case on the lower side of the two side walls 12 opposite the side wall 12, said holding section likewise serving for positioning or fixing the wiper blade adapter 55 in the direction of the second mounting or dismantling direction 18.

An adapter element 30 serving for the supplying of washing fluid and for the voltage supply is arranged within the wiper arm 10, in particular within the receiving region 11 of the wiper arm 10. On the side facing away from the wiper blade adapter 55, the adapter element 30, which is composed of plastic and is produced by injection moulding, has two inlet stubs 31 which are arranged parallel to each other and are connected to washing-fluid supply tubes 32 which are guided within the wiper arm 10 and are only illustrated in FIG. 2. Two lines 33 of the voltage supply for the heatable wiper blade 50 can be seen above the two inlet stubs 31, wherein the lines 33 are likewise arranged or guided within the wiper arm 10 on the side facing away from the wiper blade adapter 55. On the side facing away from the inlet stubs 31 or the supply lines 32, the adapter element 30 has outlet stubs 34 and pin-like connection plugs 35 which are each aligned with the inlet stubs 31 or the supply lines 32. On opposite side surfaces of the adapter element 30, said adapter element has fastening extensions 36 which are in each case integrally formed thereon and in each case have a rectangular shape with rounded sides. The fastening extensions 36 engage in a form-fitting manner or with little play in receiving openings 37, which are constructed as apertures in the side walls 12 of the wiper arm 10, and position or fix the adapter element 30 within the receiving region 11 of the wiper arm 10.

Figure 3:
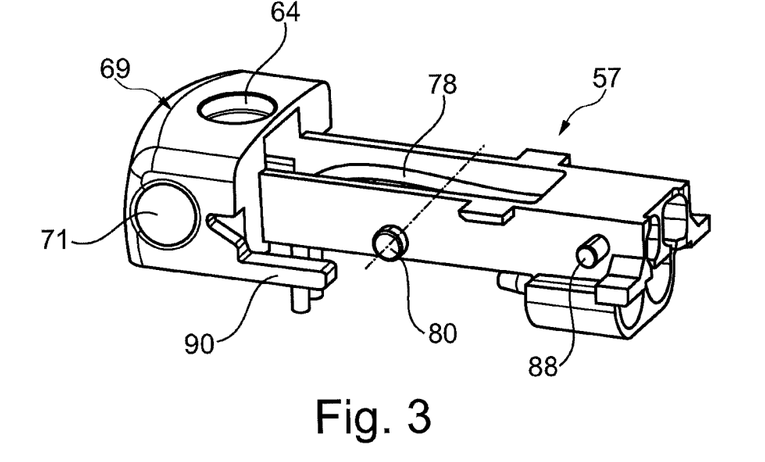
FIG. 3 shows a perspective individual illustration of a wiper blade adapter element of a wiper blade adapter.

The wiper blade adapter 55 consists of three wiper blade adapter elements 56 to 58 which interact or are connected with one another. The first wiper blade adapter element 56 has a U-shaped cross-section with two side walls 59 and an upper side 60. A detent button 62 is integrally formed on the upper side 60 via a spring tongue 61, said detent button, together with a receiving opening 64 on the second wiper blade adapter element 57, forming a detent connection 65. Constructed on the two side walls 59 are elevations 66 which in each case project outwards and the shape and arrangement of which are matched to the receiving openings 23, 24 on the wiper arm 10 in such a manner that the first wiper blade adapter element 56 can be positioned in the receiving openings 23, 24 in the wiper arm 10 via the elevations 66. Furthermore, a respective through opening 67 is formed in the side walls 59 of the first wiper blade adapter element 56.

On the lower side of the side walls 59 that faces away from the upper side 60, said side walls each additionally have a further opening 68 as part of a further detent connection.

When the wiper blade 50 or wiper blade adapter 55 is mounted on the wiper arm 10, the second wiper blade adapter element 57 has a section 69 which projects beyond the front side 19 of the wiper arm 10 and in which the receiving opening 64 is also formed. The receiving opening 64 is connected on the side facing the wiper arm 10 to an insertion opening 70 for the detent button 62. Furthermore, on mutually opposite side surfaces of the section 69, said section has indentations 71 via which an operator can manually grasp the wiper blade adapter 55 at the second wiper blade adapter element 57 and in particular can move the wiper blade 50 or the wiper blade adapter 55 in the direction of the first mounting or dismantling direction 17. On the two side surfaces of the section 69, said section furthermore has two openings 72, the shape of which is matched to the projections 21 on the wiper arm 10, and which openings interact with said projections.

On the side opposite the section 69, the second wiper blade adapter element 57 has an inlet stub 73 with two openings for the two inlet stubs 31 of the adapter element 30. Arranged above the inlet stub 73 is a bushing-shaped plug connection body 74 which interacts with the two connection plugs 35 of the adapter element 30. The openings of the inlet stub 73 and the receptacles for the connection plugs 35 in the plug connection body 74 are aligned with the outlet stubs 34 and the connection plugs 35. Within the second wiper blade adapter element 57, the inlet stub 73 is connected to two supply lines 76, 77 which conduct washing fluid, separately for each longitudinal side of the wiper blade body 52, to inlet openings (not illustrated in the figures) on the third wiper blade adapter element 58. Two connecting lines 78, 79 which serve for carrying current and serve for supplying the current to the third wiper blade adapter element 58 are likewise arranged in the plug connection body 74. On opposite side surfaces of the second wiper blade adapter element 57, the latter in each case has an extension 80 which is integrally formed on the second wiper blade adapter element 57 and engages in guide slots 81 formed on the third wiper blade adapter element 58. The second wiper blade adapter element 57 is partially accommodated in the U-shaped cross section of the first wiper blade adapter element 56.

The third wiper blade adapter element 58 which is connected directly to the wiper blade body 52 likewise has a U-shaped cross-section with two side walls 82, 83 and a base region 84 which connects the two side walls 82, 83 to each other. A total of four outlet stubs 85 for the washing fluid are arranged on the base region 84 in alignment with the washing fluid ducts which are formed in the wiper blade body 52 and lead to the spray openings on the wiper blade body 52. On outer surfaces of the side walls 82, 83 that face away from each other, said side walls each have a cross-sectionally circular extension 86 in which the receiving openings 64 of the first wiper blade adapter element 56 engage in a form-fitting manner when the wiper blade adapter 55 is mounted, and therefore the extensions 86 together with the through openings 67 form an axis of rotation about which the two wiper blade adapter elements 56 and 58 are mounted pivotably with respect to each other. Furthermore, on the side facing the adapter element 30, detent openings 87 are formed on the side of the two side walls 82, 83 which faces away from the base region 84, said detent openings interacting with extensions 88 formed on the second wiper blade adapter element 57. Further extensions 89 on the side walls 82, 83 interact with the openings 68 on the first wiper blade adapter element 56.

Figure 4:
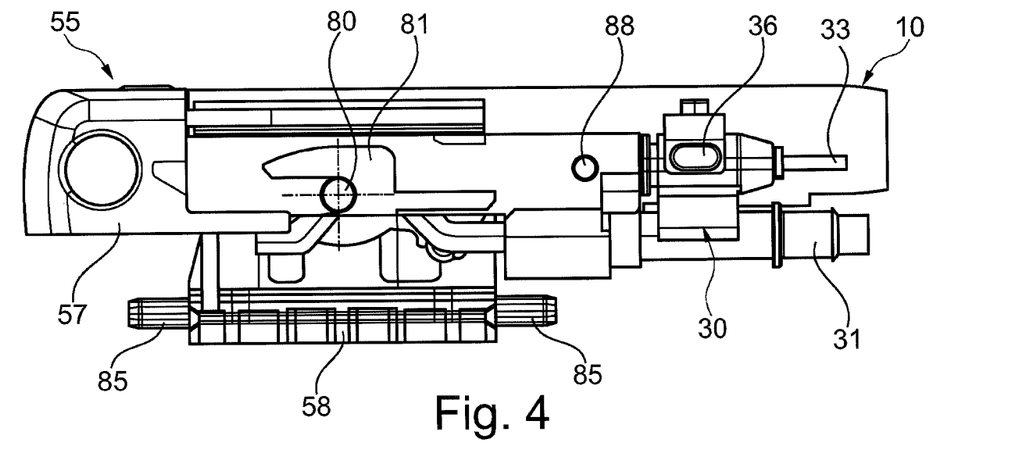
FIG. 4 shows a partially sectioned illustration of the fastening region of the wiper blade adapter to the wiper arm.

In the mounted state of the wiper blade 50 or of the wiper blade adapter 55 in the receiving region 11 of the wiper arm 10, the first wiper blade adapter element 56 is arranged in the wiper arm 10 rigidly with respect to the first mounting or dismantling direction 17 via the elevations 66 and the receiving openings 22, 24. Furthermore, the third wiper blade adapter element 58 and therefore also the wiper blade body 52 are arranged in a desired manner pivotably with respect to the first wiper blade adapter element 56 in order to permit constant bearing of the wiper blade rubber 51 against the vehicle windscreen 1 during the operation of the wiper device 100.

Figure 5:
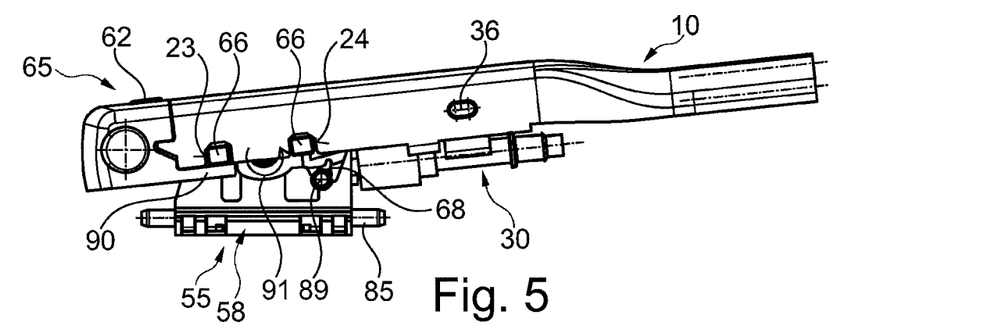
FIG. 5 to FIG. 8 show a dismantling operation of a wiper blade from a wiper arm in various phases, in each case in side view.
Figure 6:
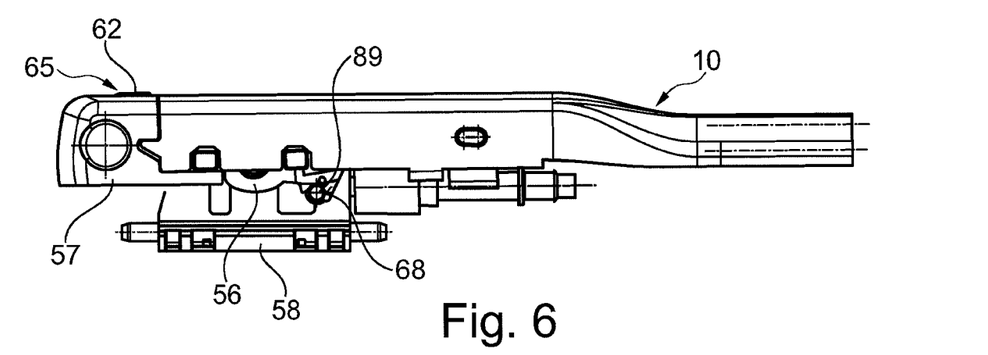
Figure 7:
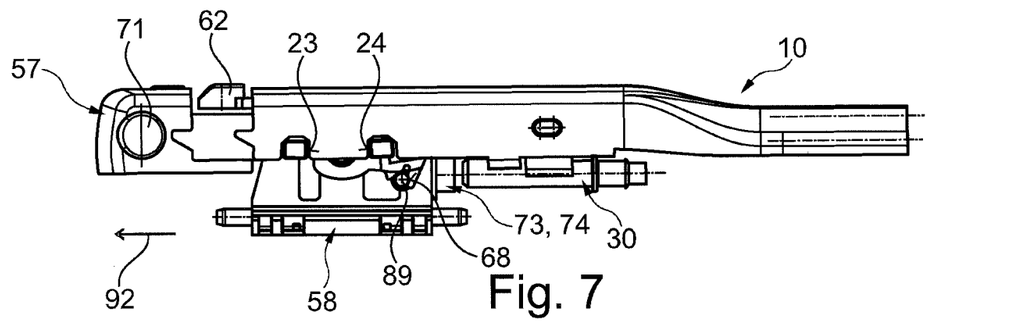

Release of the first wiper blade adapter element 56 from the receiving openings 23, 24 is prevented by the second wiper blade adapter element 57 being partially embraced by the holding sections 25 of the wiper arm 10 and by elongations 90, which are additionally integrally formed on the second wiper blade adapter element 57, according to the illustration in FIGS. 2 and 5, said elongations overlapping or closing the one receiving openings 23. Furthermore, the projections 21 of the wiper arm 10 project into the openings 72 on the second wiper blade adapter element 57. Furthermore, without the detent button 62 being depressed, a movement of the second wiper blade adapter element 57 in the direction of the first mounting or dismantling direction 17 is prevented by the detent connection 65 being formed between the first wiper blade adapter element 56 and the second wiper blade adapter element 57.

The dismantling of the wiper blade 50 or of the wiper blade adapter 55 from the wiper arm 10 will now be described with reference to FIGS. 5 to 8, as follows: according to FIG. 5, in a first step, the third wiper blade adapter element 58 is aligned with respect to the wiper arm 10 by rotation anticlockwise in the direction of the arrow 91. This state is illustrated in the final position in FIG. 6. The extensions 89 engage here in the openings 68 forming a detent connection. Subsequently, according to FIG. 7, the detent button 62 is pressed into the receiving opening 64 and the second wiper blade adapter element 57 is pulled out of the receiving region 11 of the wiper arm 10 according to the arrow 92. As a result, the inlet stub 73 and the plug connection body 74 are also pulled out of the adapter element 30. At the same time, the receiving openings 23, 24 are released by the elongations 90 such that subsequently, according to FIG. 8, the wiper blade 50 can be separated from the wiper arm 10 by a relative movement between the wiper blade adapter 55 and the wiper arm 10 in the direction of the arrow 91.

The wiper blade 50 or the wiper blade adapter 55 is mounted analogously in a reverse sequence.

Figures 8, 9:
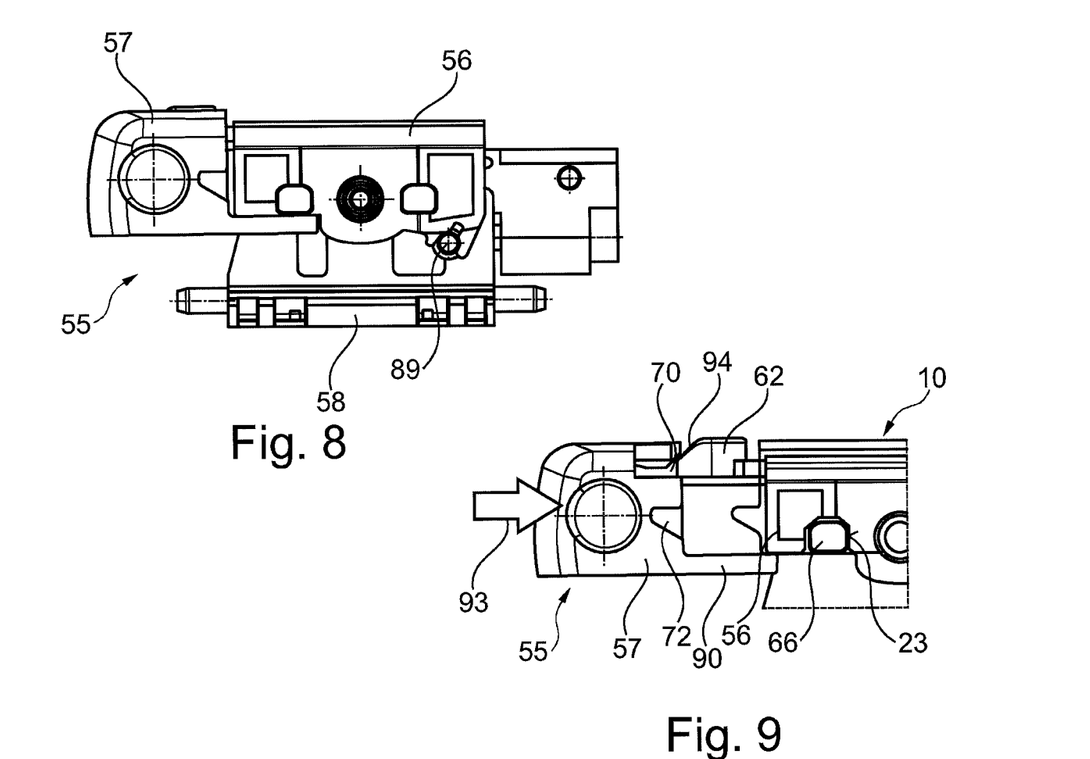
FIG. 9 shows a sectioned illustration of a detail of the wiper blade adapter.

FIG. 9 illustrates the state in which the wiper blade adapter 55 is already inserted by the elevations 66 into the receiving openings 23, 24 of the wiper arm 10. During the subsequent pushing of the second wiper blade adapter element 57 in the direction of the arrow 93, it is ensured, by corresponding dimensioning of the elongations 90, that the first wiper blade adapter element 56 is aligned with the second wiper blade adapter element 57 in such a manner that the detent button 62 is inserted into the insertion opening 70 only when the two wiper blade adapter elements 56, 57 are correspondingly aligned. In particular, the detent button 62 can be inserted by means of the slope 94 thereof into the insertion opening 70 without locking between the detent button 62 and the insertion opening 70 being able to occur, which locking could lead, for example, to damage or to the detent button 62 or the spring tongue 61 breaking off.

Figure 10:
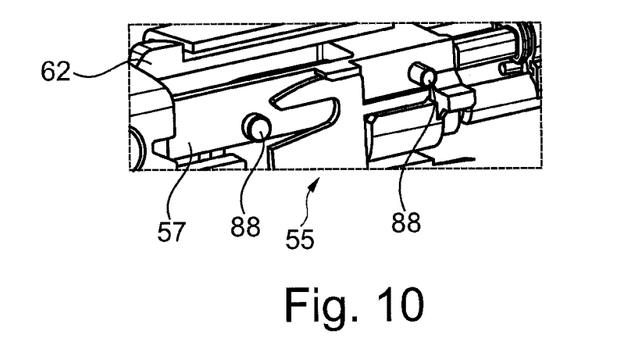
FIG. 10 shows a sectioned, perspective illustration of a further detail of the wiper blade adapter.

FIG. 10 illustrates the state of the wiper blade adapter 55 according to FIG. 7 once again in detail. In particular, it is seen that a pivoting movement of the second wiper blade adapter element 57 is prevented by rectangular projections 95 (FIG. 2), which are integrally formed on the side surfaces of the second wiper blade adapter element 57, in conjunction with the guide slots 81.

Figure 11:
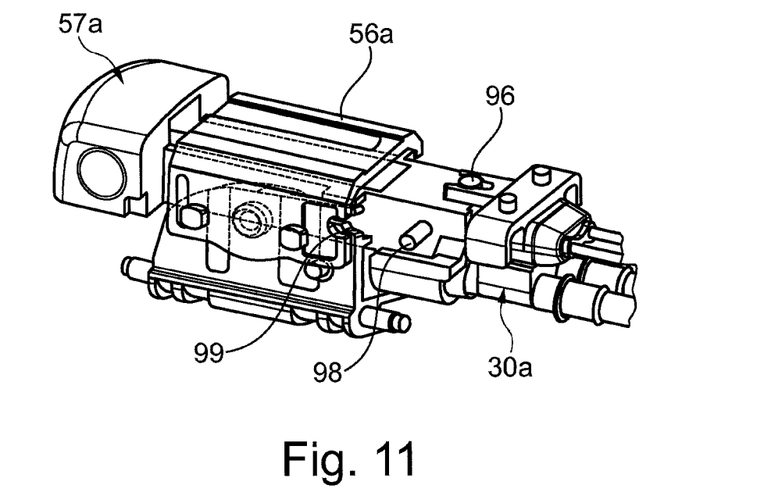
FIG. 11 and FIG. 12 show a modified wiper blade adapter in the operating position and in the dismantling position, in each case in a perspective, partially sectioned illustration.
Figure 12:
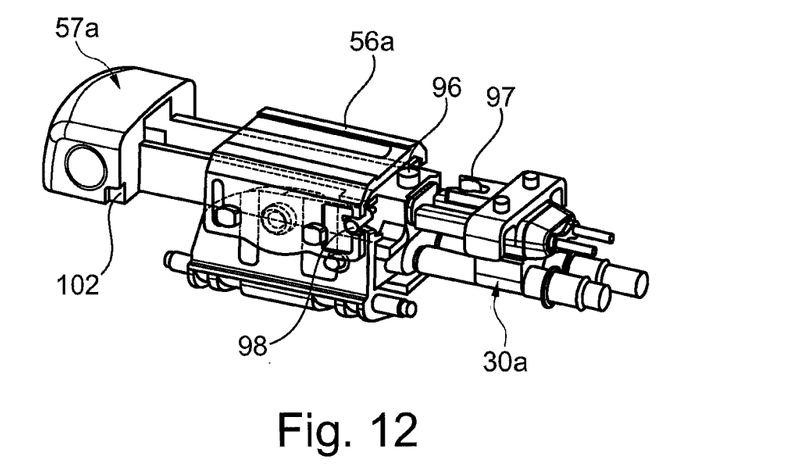

FIGS. 11 and 12 illustrate a modified embodiment of the invention, in which the second wiper blade adapter element 57*a* has, on the upper side thereof, on the side facing the adapter element 30*a* a cross-sectionally cylindrical extension 96 which, in order to form a detent connection, interacts with a detent opening 97 which is integrally formed on the adapter element 30*a*. Furthermore, a cylindrically formed extension 98 is also seen on the one side wall of the second wiper blade adapter element 57*a*, said extension interacting with an opening 99 formed on the first wiper blade adapter element 56*a* and, in the dismantling position of the second wiper blade adapter element 57*a* that is illustrated in FIG. 12, pivotability of the wiper arm 10 with respect to the second wiper blade adapter element 57*a* is ensured. Furthermore, it can be seen at the second wiper blade adapter element 57*a* that the latter has a recess 102 in a lower region on the side facing the first wiper blade adapter element 56*a*. The recess 102 interacts with a correspondingly formed projection (not illustrated) on the front side facing it of the wiper arm 10 (likewise not illustrated) in analogy with the projection 21 in the case of the wiper arm according to FIG. 2 in such a manner that the recess 102 serves together with the holding sections 25 of the wiper arm 10 to fix the wiper blade adapter 55 in the wiper arm 10. In contrast to the wiper blade adapter element 57, the second wiper blade adapter element 57*a* therefore does not have any elongations 90 which, in the locking state of the second wiper blade adapter element 57*a*, hold the first wiper blade adapter element 56*a* or the elevations 66 thereof in the receiving openings 23, 24 of the wiper arm 10.

FIGS. 13 to 16 illustrate a further exemplary embodiment of the invention. In analogy to FIGS. 11 and 12, the recess 102 which is formed on the second wiper blade adapter element 57*b* and interacts with the projection 21 formed on the wiper arm 10 is seen. As in particular can be seen with reference to an overall view of FIGS. 14 and 16, the first wiper blade adapter element 56*b* and the second wiper blade adapter element 57*b* are positioned with respect to each other in the direction of the second mounting or dismantling direction 18 via a form-fitting connection. For this purpose, the first wiper blade adapter element 56*b* has, within the U-shaped cross-section thereof, detent hook elements 104, 105 which project perpendicularly from the lower side 103 thereof and are arranged so as to be pivotable elastically by a certain degree in the direction of the double arrow 106. The detent hook elements 104, 105 interact with guides 107, 108 formed on the second wiper blade adapter element 57*b*. It is also essential that the detent hook elements 104, 105 and the guides 107, 108 each have oblique run-on surfaces 109, 110 which, during mounting of the two wiper blade adapter elements 56*b*, 57*b*, enable the detent hook elements 104, 105 to pivot in the one direction of the double arrow 106. In the mounted position illustrated in FIG. 14, the detent hook elements 104, 105 engage behind the guides 107, 108 such that the two wiper blade adapter elements 56*b*, 57*b* are positioned or fixed with respect to each other in the direction of the second mounting or dismantling direction 18.

Figure 13:
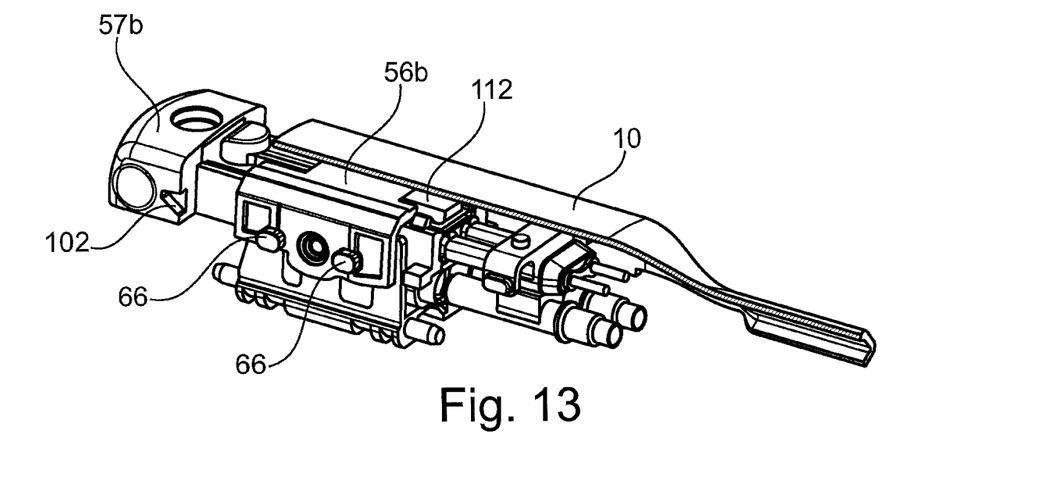
FIG. 13 shows a perspective, partially sectioned illustration of a modified wiper device.
Figure 14:
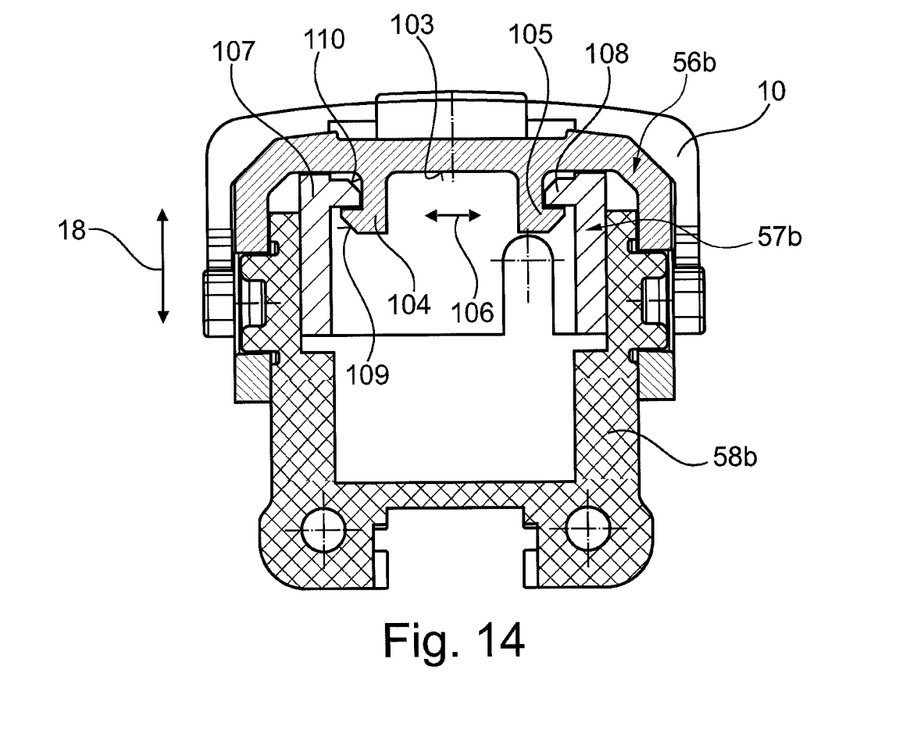
FIG. 14 shows a cross-section through the wiper device according to FIG. 13.
Figure 15:
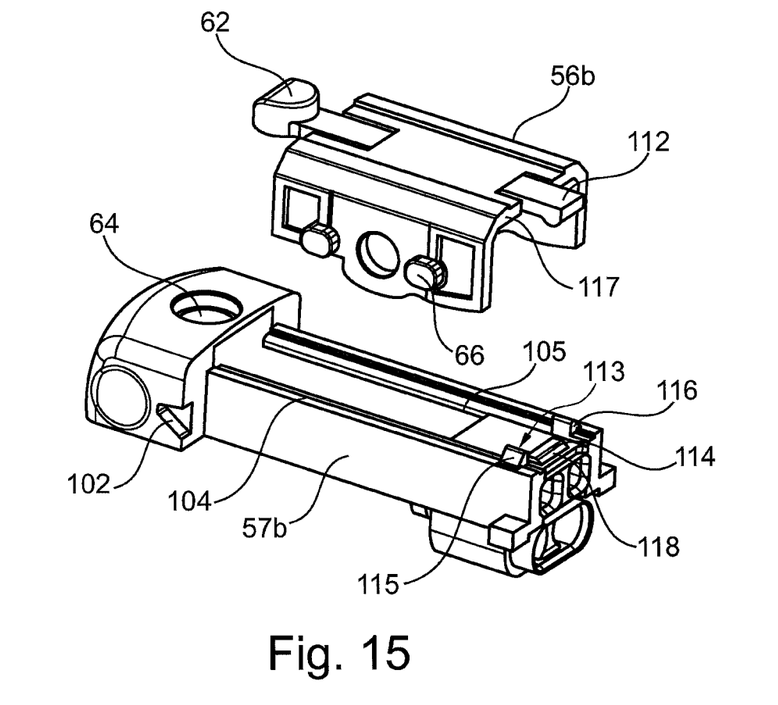
FIG. 15 shows two wiper blade adapter elements of the wiper blade adapter according to FIGS. 13 and 14, FIG. 16a and FIG. 16b show the mounting sequence of the wiper blade adapter elements of the wiper blade adapter according to FIG. 13 in cross-section.

As can furthermore be seen with reference to FIGS. 13 and 15, on the side facing away from the detent button 62 the first wiper blade adapter element 56*b* has a detent hook 112 which interacts with a projection 114 formed on the upper side 113 of the second wiper blade adapter element 57*b*. Furthermore, two further projections 115, 116 can be seen laterally next to the projection 114, said further projections acting as stop elements for the front surface 117 of the second wiper blade adapter element 57*b*. At least on the side facing away from the detent button 62, the projection 114 has a slope 118, and therefore by pushing in the second wiper blade adapter element 57*b* by the detent button 62 thereof in the direction of the wiper arm 10, the first wiper blade adapter element 56*b* can be brought by the detent button 62 thereof into operative connection with the receiving opening 64, with the detent hook 112 passing over the projection 114.

Figure 16A:
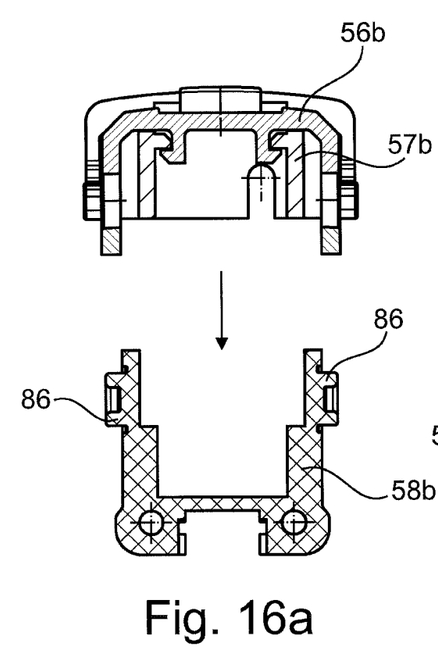
Figure 16B:
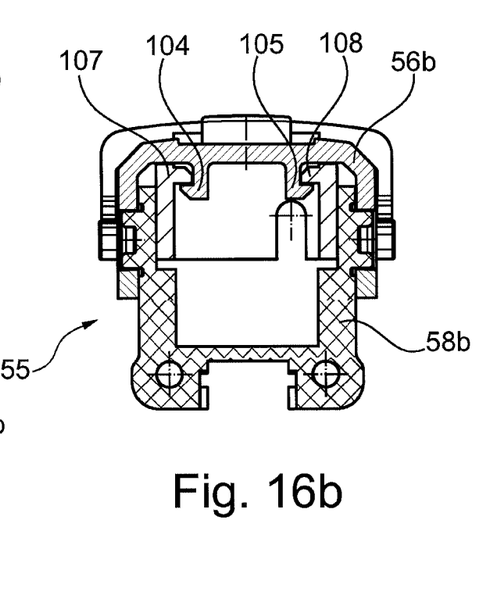
Figure 17:
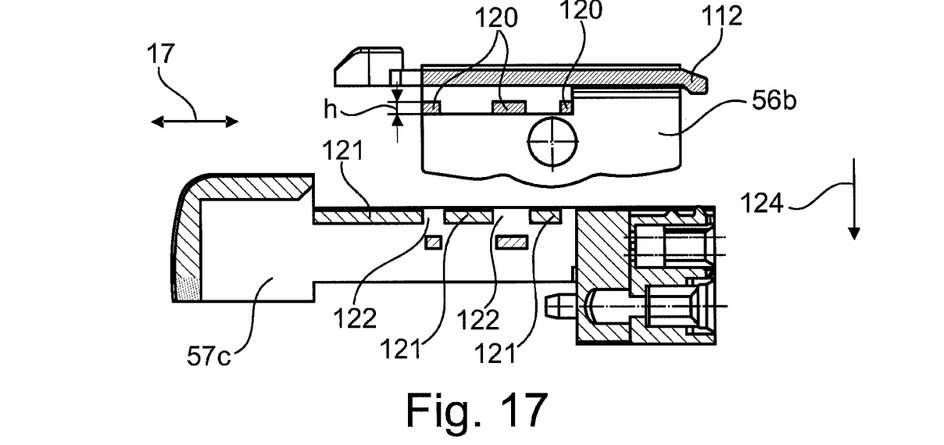
FIG. 17 to FIG. 19 show the mounting sequence of two further modified wiper blade adapter elements in side view.
Figure 18:
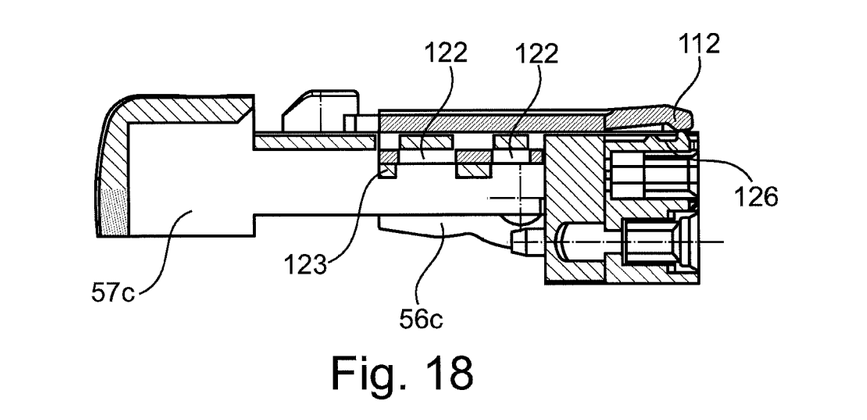
Figure 19:
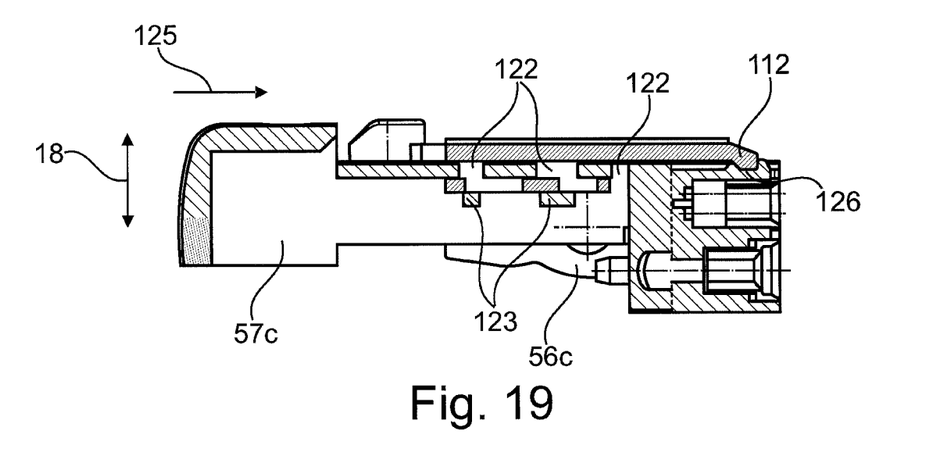

For the mounting of the wiper blade adapter 55, according to FIG. 16*a*, first of all the two wiper blade adapter elements 56*b*, 57*b* are connected to each other by means of the detent hook elements 104, 105 and the guides 107, 108. Subsequently, according to FIG. 16*a*, a relative movement with respect to the third wiper blade adapter element 58*b* takes place such that the extensions 86 formed on the third wiper blade adapter element 58*b* engage in the receptacles formed on the first wiper blade adapter element 56*b*, as a result of which the third wiper blade adapter element 58*b* is arranged pivotably with respect to the two wiper blade adapter elements 56*b*, 57.

FIGS. 17 to 22 illustrate a further modified embodiment of the invention. In this embodiment, respective guide webs 120 with the height h are formed on the two opposite side surfaces of the first wiper blade adapter element 56*c*. In the exemplary embodiment illustrated, the two side surfaces of the first wiper blade adapter element 56*c* each have three holding webs 120 which are arranged spaced apart from one another and can differ in length. The holding webs 120 are arranged here at the same height parallel to the first mounting or dismantling direction 17. Guide webs 121 having recesses 122 are formed in each case on the mutually opposite side surfaces of the second wiper blade adapter element 57*c*, wherein the length of the recesses 122 and the arrangement thereof on the guide webs 121 are matched to the length and to the arrangement of the holding webs 120 on the first wiper blade adapter element 56*c*. Below the guide webs 121, two stop webs 123 are arranged aligned with the recesses 122. The distance between the stop webs 123 and the guide webs 121 corresponds to the height h of the holding webs 120. For the mounting of the two wiper blade adapter elements 56*c*, 57*c*, the latter are moved relative to each other in the direction of the arrow 124 in such a manner that the holding webs 120 are inserted, according to FIG. 18, into the recesses 122 until said holding webs bear against the stop webs 123. Subsequently, according to FIG. 19, a relative movement of the two wiper blade adapter elements 56*c*, 57*c* in the direction of the arrow 125 takes place, as a result of which the detent hook 112 passes into a recess 126 formed on the upper side of the second wiper blade adapter element 57*c*. In this position, the holding webs 120 are arranged between the guide webs 121 and the stop webs 123 and outside the recess 122 such that the two wiper blade adapter elements 56*c*, 57*c* are positioned and fixed with respect to each other in the direction of the second mounting or dismantling direction 18.

Figure 20:
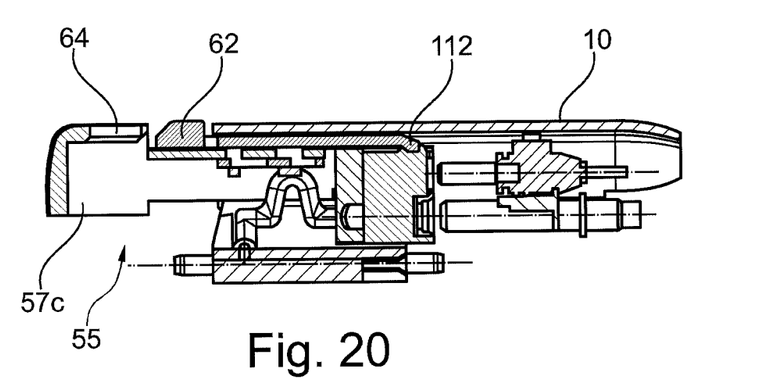
FIG. 20 to FIG. 22 show the mounting operation of the modified wiper blade adapter according to FIGS. 17 to 19 on a wiper arm in simplified longitudinal sections.
Figure 21:
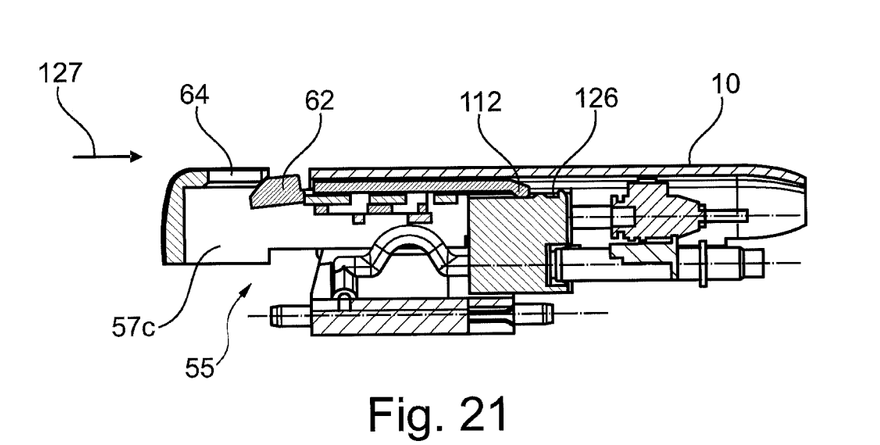
Figure 22:
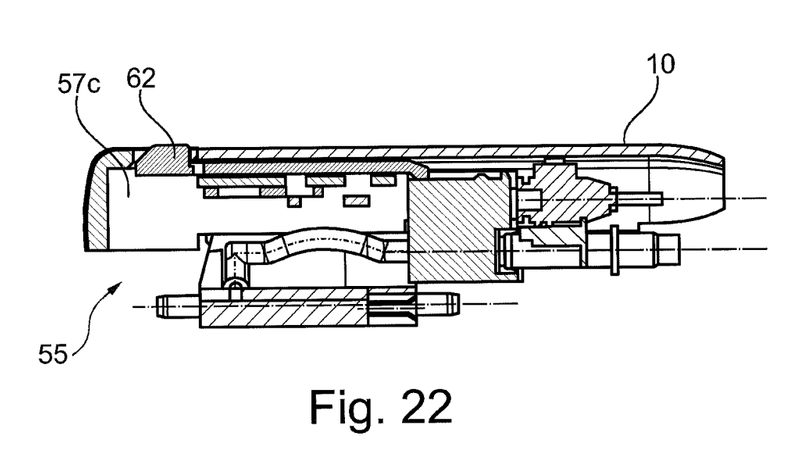

For the mounting of the wiper blade adapter 55 on the wiper arm 10, according to the sequence of figures of FIGS. 20 to 22, first of all the detent button 62 is pressed downwards and the second wiper blade adapter element 57c is moved in the direction of the arrow 127 toward the wiper arm 10. In the process, the detent hook 112 passes outside the recess 126. FIG. 22 illustrates the final state in which the detent button 62 is arranged in the receiving opening 64 of the second wiper blade adapter element 57c.

The wiper device 100 described to this extent can be modified in diverse ways without departing from the inventive concept.

LIST OF REFERENCE SIGNS

1 Vehicle windscreen
2 Wiper arm joint
10 Wiper arm
11 Receiving region
12 Side wall
13 Transverse wall
14 Longitudinal axis
15 Longitudinal axis of the wiper blade
17 First mounting or dismantling direction
18 Second mounting or dismantling direction
19 Front side
21 Projection
23 Receiving opening
24 Receiving opening
25 Holding section
30, 30a Adapter element
31 Inlet stub
32 Supply tube
33 Line
34 Outlet stub
35 Connection plug
36 Fastening extension
37 Receiving opening
50 Wiper blade
51 Wiper blade rubber
52 Wiper blade body
55 Wiper blade adapter
56, 56a, 56b, 56c First wiper blade adapter element
57, 57a, 57b, 57c Second wiper blade adapter element
58, 58b Third wiper blade adapter element
59 Side wall
60 Upper side
61 Spring tongue
62 Detent button
64 Receiving opening
65 Detent connection
66 Elevation
67 Through opening
68 Opening
69 Section
70 Insertion opening
71 Indentation
72 Opening
73 Inlet stub
74 Plug connection body
76 Supply line
77 Supply line
78 Connecting line
79 Connecting line
80 Extension
91 Guide slots
82 Side wall
83 Side wall
84 Base region
85 Outlet stub
86 Extension
87 Detent opening
88 Extension
89 Extension
90 Elongation
91 Arrow
92 Arrow
93 Arrow
94 Slope
95 Projection
96 Extension
97 Detent opening
98 Extension
99 Opening
100 Wiper device
102 Recess
103 Lower side
104 Detent hook element
105 Detent hook element
106 Double arrow
107 Guide
108 Guide
109 Run-on surface
110 Run-on surface
112 Detent hook
113 Upper side
114 Projection
115 Projection
116 Projection
117 Front surface
118 Slope
120 Holding web
121 Guide web
122 Recess
123 Stop web
124 Arrow
125 Arrow
126 Recess
127 Arrow
h Height

The invention claimed is:

1. An assembly, comprising:
a wiper arm for a windscreen wiper system of a motor vehicle;
a wiper blade adapter, and
an adapter element configured to supply washing fluid,
wherein the wiper arm comprises a receiving region for the wiper blade adapter and for the adapter element, the receiving region having a U-shaped cross-section with two side walls parallel to one another and a transverse wall connecting the two side walls, and having at least two receiving openings constructed on the two side walls to receive elevations arranged on the wiper blade adapter in a second mounting or respectively dismantling direction running at least substantially perpendicularly to the transverse wall,
wherein the adapter element is able to be connected with a first supply line for the washing fluid and has at least one outlet for the washing fluid, which is able to be connected with the wiper blade adapter,
wherein the at least one outlet is aligned with a mounting direction or a dismantling direction of the wiper blade adapter,
wherein the at least one outlet runs at least approximately in the direction of a longitudinal axis of the wiper arm in the receiving region, and the receiving region is constructed to enable mounting or dismantling of the wiper blade adapter by movement of the wiper blade adapter in the mounting direction or the dismantling direction, respectively, and wherein the wiper blade adapter comprises three wiper blade adapter elements connected with one another, such that a second wiper blade adapter element and a third wiper blade adapter element mate with a first wiper blade adapter element, wherein one of the three wiper blade adapter elements comprises at least one second supply line disposed within the wiper blade adapter, the at least one second supply line being a separate constructional element from a remainder of the wiper blade adapter, wherein the adapter element has, on a side facing one of the two side walls, respectively, a fastening extension projecting into a corresponding one of the at least two receiving openings of the one side wall having a closed cross-section, and wherein cross-sections of the receiving opening and of the fastening extension are coordinated with one another so that the adapter element is arranged in a stationary manner in the receiving opening.

2. The assembly according to claim 1, wherein the adapter element is constructed in addition for the supply of current of a wiper blade, having a heating device, by means of the wiper blade adapter.

3. The assembly according to claim 2, wherein current-carrying elements, serving for the supply of current, arranged on the side of the adapter element facing the wiper blade adapter, are arranged parallel to the at least one outlet.

4. The assembly according to claim 1, wherein on the side walls in the region of an open front side of the receiving region, projections are provided, projecting away from the front side and aligned with the side walls, which projections are constructed to hold the wiper blade adapter in the receiving region in its operating position in a direction running perpendicularly to the mounting or respectively dismantling direction.

5. A wiper blade for fastening to the assembly according to claim 1, with the wiper blade adapter, which is constructed to be received in the wiper arm,
wherein at least one inlet for the supplying of a washing fluid is arranged on the wiper blade adapter,
wherein the at least one inlet is aligned parallel to the mounting direction or the dismantling direction of the wiper blade adapter, and
wherein the wiper blade adapter consists of at least two wiper blade adapter elements, and the at least two wiper blade adapter elements are constructed to be received in the wiper arm in a second mounting or respectively dismantling direction arranged substantially perpendicularly to the mounting or respectively dismantling direction.

6. The wiper blade according to claim 5, wherein on the first wiper blade adapter element of the wiper blade adapter, elevations are constructed on its side walls for introduction in receiving openings of the wiper arm, and that at least some of the elevations are locked by the second wiper blade adapter element in the operating position of the wiper blade in the receiving openings.

7. The wiper blade according to claim 5, wherein between two of the wiper blade adapter elements a detent connection is constructed, which fixes the two wiper blade adapter elements with respect to one another in the direction of the mounting or respectively dismantling direction.

8. The wiper blade according to claim 5, wherein between the second wiper blade adapter element and the adapter element a detent connection is constructed, which fixes the second wiper blade adapter element in the direction of the mounting or respectively dismantling direction.

9. The wiper blade according to claim 5, wherein in the second wiper blade adapter element openings are provided for the receiving of projections constructed on the wiper arm, which are constructed to hold the wiper blade adapter in its operating position in a direction running perpendicularly to the mounting or respectively dismantling direction.

10. The assembly according to claim 5, wherein the first wiper blade adapter element and the second wiper blade adapter element are positioned with respect to one another by a form-fitting connection in the direction of the second mounting or respectively dismantling direction.

11. The assembly according to claim 10, wherein the form-fitting connection comprises detent hook elements constructed on one of the wiper blade adapter elements, which detent hook elements embrace guides constructed on the other of the wiper blade adapter elements, and that the detent hook elements are constructed such that through a relative movement of the two wiper blade adapter elements in the direction of the second mounting or respectively dismantling direction, the detent hook elements embrace the guides and, in doing so, lock them in position.

12. The assembly according to claim 10, wherein the form-fitting connection has guide webs constructed on one of the wiper blade adapter elements, arranged parallel to the mounting or respectively dismantling direction, with recesses formed between the guide webs, wherein holding webs constructed on the other of the wiper blade adapter elements are able to be introduced into the recesses into a height beneath the guide webs, and wherein the holding webs after the introduction into the guide webs are displaceable in a direction parallel to the mounting or respectively dismantling direction such that the holding webs are arranged in overlap with the guide webs.

13. The assembly according to claim 12, wherein stop webs are provided parallel the guide webs, that the distance between the guide webs and the stop webs corresponds to the height of the holding webs, and that the stop webs are arranged at least partially aligned to the recesses.

14. The assembly according to claim 10, wherein the first wiper blade adapter element or the second wiper blade adapter element has at least one stop element, which acts as a movement stop for the two wiper blade adapter elements in the direction of the mounting or respectively dismantling direction.

15. A wiper blade for fastening to the assembly according to claim 1, with the wiper blade adapter constructed to be received in the wiper arm,
wherein at least one inlet for the supplying of a washing fluid is arranged on the wiper blade adapter,
wherein the at least one inlet is aligned parallel to the mounting direction or the dismantling direction of the wiper blade adapter,
wherein the wiper blade adapter consists of at least two wiper blade adapter elements, and the at least two wiper blade adapter elements are constructed to be received in the wiper arm in a second mounting or respectively dismantling direction arranged substantially perpendicularly to the mounting or respectively dismantling direction,
wherein the wiper blade adapter comprises the third wiper blade adapter element, which is connected directly with a wiper blade body of the wiper blade, the first and the third wiper blade adapter elements being arranged swivelably with respect to one another, and wherein the third wiper blade adapter element has a U-shaped cross-section, in which the second wiper blade adapter element is received at least partially, and that the first wiper blade adapter element has a U-shaped cross-section, which partially receives the second wiper blade adapter element and encompasses the third wiper blade adapter element in the region of its side walls.

16. A wiper blade for fastening to the assembly according to claim 1, with the wiper blade adapter constructed to be received in the wiper arm, wherein at least one inlet for the supplying of a washing fluid is arranged on the wiper blade adapter, wherein the at least one inlet is aligned parallel to the mounting direction or the dismantling direction of the wiper blade adapter, wherein the wiper blade adapter consists of at least two wiper blade adapter elements, and the at least two wiper blade adapter elements are constructed to be received in the wiper arm in a second mounting or respectively dismantling direction arranged substantially perpendicularly to the mounting or respectively dismantling direction, wherein the wiper blade adapter comprises the third wiper blade adapter element, which is connected directly with a wiper blade body of the wiper blade, and that the first and the third wiper blade adapter element are arranged swivelably with respect to one another, and wherein the second wiper blade adapter element has extensions, which are arranged swivelably and displaceably into guide slots of the third wiper blade adapter element.

17. A wiper device for cleaning vehicle windows, comprising:

the assembly according to claim 1; and a wiper blade for fastening to the wiper arm, with the wiper blade adapter, which is constructed to be received in the wiper arm, wherein at least one inlet for the supplying of a washing fluid is arranged on the wiper blade adapter, and wherein the at least one inlet is aligned parallel to the mounting direction or the dismantling direction of the wiper blade adapter, wherein the wiper blade adapter consists of at least two wiper blade adapter elements, and the at least two wiper blade adapter elements are constructed to be received in the wiper arm in a second mounting or respectively dismantling direction arranged substantially perpendicularly to the mounting or respectively dismantling direction.

18. An assembly comprising:

a wiper blade adapter configured to connect a wiper arm and wiper blade of a windscreen wiper system of a motor vehicle, and an adapter element configured to supply washing fluid, wherein the adapter element is able to be connected with a first supply line for the washing fluid and has at least one outlet for the washing fluid, which is able to be connected with the wiper blade adapter, wherein the wiper blade adapter comprises three wiper blade adapter elements connected with one another, such that a second wiper blade adapter element and a third wiper blade adapter element mate with a first wiper blade adapter element, and wherein the third wiper blade adapter element has a U-shape and the second wiper blade adapter element is received between lateral walls of the U-shape, and wherein the first and the third wiper blade adapter element are arranged swivelably with respect to one another.

* * * * *